US012811169B2

(12) United States Patent
Lee et al.

(10) Patent No.: US 12,811,169 B2
(45) Date of Patent: Nov. 24, 2026

(54) HOLLOW FIBER MEMBRANE CARTRIDGE ASSEMBLY

(71) Applicant: NVH KOREA, INC., Buk-gu (KR)

(72) Inventors: Cheol Hee Lee, Ansan-si (KR); Jong Hyun Ryu, Ansan-si (KR)

(73) Assignee: NVH KOREA, INC., Buk-Gu (KR)

( * ) Notice: Subject to any disclaimer, the term of this patent is extended or adjusted under 35 U.S.C. 154(b) by 285 days.

(21) Appl. No.: 18/700,439

(22) PCT Filed: Jun. 10, 2022

(86) PCT No.: PCT/KR2022/008234
§ 371 (c)(1),
(2) Date: Apr. 11, 2024

(87) PCT Pub. No.: WO2023/063522
PCT Pub. Date: Apr. 20, 2023

(65) Prior Publication Data
US 2025/0023068 A1 Jan. 16, 2025

(30) Foreign Application Priority Data
Oct. 15, 2021 (KR) ........................ 10-2021-0137288

(51) Int. Cl.
*H01M 8/04119* (2016.01)
*B01D 63/02* (2006.01)
(Continued)

(52) U.S. Cl.
CPC ...... *H01M 8/04149* (2013.01); *B01D 63/022* (2013.01); *B01D 63/046* (2013.01);
(Continued)

(58) Field of Classification Search
CPC ............... H01M 8/04149; H01M 8/04; H01M 8/04119; B01D 63/022; B01D 2313/083;
(Continued)

(56) References Cited

U.S. PATENT DOCUMENTS 9,461,318 B2 * 10/2016 Kim .................. H01M 8/04291
2017/0358808 A1 * 12/2017 Kim .................. H01M 8/04149
(Continued)

FOREIGN PATENT DOCUMENTS

JP 2002081703 A 3/2002
JP 2004165064 A 6/2004
(Continued)

OTHER PUBLICATIONS

International Search Report and Written Opinion received for PCT/KR2022/008234, mailed Sep. 22, 2022.
(Continued)

*Primary Examiner* — Jennifer Dieterle
*Assistant Examiner* — Miriam N Ezeluomba
(74) *Attorney, Agent, or Firm* — Greer, Burns & Crain, Ltd

(57) ABSTRACT

A hollow fiber membrane cartridge assembly, mounted in a fuel cell membrane humidifier, wherein the hollow fiber membrane cartridge assembly includes a first hollow fiber membrane cartridge and a second hollow fiber membrane cartridge having the same length and arranged in parallel with each other, a first adapter that has a first hole to accommodate an end part of a side of the first hollow fiber membrane cartridge, a second hole to accommodate an end part of a side of the second hollow fiber membrane cartridge, and a bypass hole, a second adapter that has a first hole to accommodate an end part of an opposite side of the first hollow fiber membrane cartridge and a second hole to accommodate an end part of an opposite side of the second hollow fiber membrane cartridge and faces the first adapter, and a bypass pipe coupled to the bypass hole is disclosed.

4 Claims, 5 Drawing Sheets

(51) Int. Cl.
*B01D 63/04* (2006.01)
*H01M 8/04* (2016.01)

(52) U.S. Cl.
CPC ......... *H01M 8/04* (2013.01); *B01D 2313/083* (2013.01); *B01D 2313/201* (2022.08); *H01M 8/04119* (2013.01); *Y02E 60/50* (2013.01)

(58) Field of Classification Search
CPC ........... B01D 2313/201; B01D 63/046; B01D 63/02; Y02E 60/50
USPC ............................................................ 261/23
See application file for complete search history.

(56) References Cited

U.S. PATENT DOCUMENTS

| | | | | |
|---|---|---|---|---|
| 2018/0062187 | A1 * | 3/2018 | Kim .................. | H01M 8/04149 |
| 2018/0316028 | A1 | 11/2018 | An et al. | |
| 2021/0111420 | A1 | 4/2021 | Ahn et al. | |

FOREIGN PATENT DOCUMENTS

| | | | | |
|---|---|---|---|---|
| JP | 2005-034715 | A | 2/2005 | |
| JP | 2005-337539 | A | 12/2005 | |
| JP | 2016035895 | A | 3/2016 | |
| JP | 2018037387 | A | 3/2018 | |
| KR | 10-1673667 | B1 | 11/2016 | |
| KR | 101675742 | B1 * | 11/2016 | ................ F24F 6/00 |
| KR | 10-1896323 | B1 | 9/2018 | |
| KR | 10-2018-0119828 | A | 11/2018 | |
| KR | 20180119828 | A | 11/2018 | |
| KR | 10-2020-0182486 | A | 12/2020 | |
| KR | 10-2021-0096848 | A | 7/2021 | |
| KR | 102 304 857 | B1 | 9/2021 | |

OTHER PUBLICATIONS

Request for the Submission of an Opinion received for Korean Application No. 10-2021-0137288 dated May 2, 2023.

Written Decision on Registration for Korean Application No. 10-2021-0137288, dated Dec. 4, 2023.

Notice of Reasons for Refusal received fro Japanese Patent Application No. 2024-521785, dated Feb. 4, 2025.

Notice to Grant a Patent received fro Japanese Patent Application No. 2024-521785, dated Oct. 28, 2025.

Extended Supplementary European Search Report received for Application No. 22881153.5, dated Jul. 22, 2025.

* cited by examiner

HOLLOW FIBER MEMBRANE CARTRIDGE ASSEMBLY

CROSS REFERENCE TO RELATED APPLICATION

This Application is a Section 371 National Stage Application of International Application No. PCT/KR2022/008234, filed Jun. 10, 2022, the contents of which is hereby incorporated by reference in its entirety.

BACKGROUND

The present disclosure relates to a membrane humidifier for a fuel cell.

In addition, the present disclosure relates to Patent Application No. 10-2020-0182486, filed on Dec. 23, 2020, and Patent Application No. 10-2021-0096848, filed on Jul. 23, 2021, by the same applicant.

Through Korean Patent Application Publication No. 10-2018-0119828 and Korean Patent No. 10-2304857, a purpose, a structure, an operating principle, and the like of a membrane humidifier for a fuel cell may be confirmed.

With reference to FIG. 1 [representative diagram of Korean Patent Application Publication No. 10-2018-0119828], the membrane humidifier for a fuel cell 1 includes: a main housing 10 having a gas inlet 11 and a gas outlet 12 and provided with an empty space in a longitudinal direction therein; an inlet housing 20 having an air inlet 21 and coupled to a rear part of the main housing 10; an outlet housing 30 having an air outlet 31 and coupled to a front part of the main housing 10; and a hollow fiber membrane cartridge 40 provided inside the main housing 10.

Meanwhile, with reference to Korean Patent No. 10-1673667, a hollow fiber membrane cartridge is configured to be divided into a plurality of module types in consideration of humidification efficiency and the like. In this case, there is a problem in that an empty space is provided between the modules, causing airtightness to be reduced. At this time, when a potting layer is provided in the empty space above to fix the problem mentioned above, there is a problem in that the assemblibility deteriorates.

On the other hand, again, with reference to Korean Patent No. 10-1896323, some membrane humidifiers for fuel cells may include a bypass pipe connecting the lower region of the outlet housing and the upper region of the hollow fiber membrane cartridge. The bypass pipe functions to prevent condensate from accumulating in the membrane humidifier for a fuel cell and from flowing into the fuel cell stack.

However, in the membrane humidifier for a fuel cell disclosed in the publication mentioned above, the bypass pipe (described as "bypass pipe 60" in the publication) is integrated with the outlet housing (described as "second cap portion 50" in the publication) using injection molding. In this case, there are problems in that (a) when the bypass pipe sustains damage, the whole outlet housing needs to be replaced, and (b) in the process of separating the outlet housing from the main housing, the bypass pipe may cause damage to the hollow fiber membrane cartridge, or an end part (the part inserted into the hollow fiber membrane cartridge) of the bypass pipe may be susceptible to damage. In addition, (c) provided the shape of the bypass pipe is taken into account, integrating the bypass pipe with the outlet housing using injection molding poses a challenge.

SUMMARY

Technical Problem

Accordingly, the present disclosure has been made keeping in mind the above problems occurring in the related art and is intended to provide a hollow fiber membrane cartridge assembly that includes a bypass pipe and has excellent airtightness and assemblability while even being provided with multiple hollow fiber membrane cartridges.

Technical Solution

In order to accomplish the above objectives, there may be provided a hollow fiber membrane cartridge according to an embodiment (of the present disclosure), which is a hollow fiber membrane cartridge assembly to be mounted in a fuel cell membrane humidifier, the hollow fiber membrane cartridge including: a first hollow fiber membrane cartridge and a second hollow fiber membrane cartridge having the same length and arranged in parallel with each other; a first adapter that has a first hole configured to accommodate an end part of a side of the first hollow fiber membrane cartridge, a second hole configured to accommodate an end part of a side of the second hollow fiber membrane cartridge, and a bypass hole; a second adapter that has a first hole configured to accommodate an end part of an opposite side of the first hollow fiber membrane cartridge and a second hole configured to accommodate an end part of an opposite side of the second hollow fiber membrane cartridge and faces the first adapter; and a bypass pipe configured to be coupled to the bypass hole In addition, wherein a protrusion part is provided on an upper part of the bypass pipe, and a depression part configured to accommodate the protrusion part is provided on a side surface of the first adapter.

In addition, on a circumference of a side surface of each of the first hole and the second hole of the first adapter, cartridge guide protrusions are provided at regular intervals.

In addition, on a circumference of a side surface of each of the first hole and the second hole of the second adapter, cartridge guide protrusions are provided at regular intervals.

Advantageous Effects

The hollow fiber membrane cartridge according to an embodiment assembly that includes a bypass pipe and has excellent airtightness and assemblability while even being provided with multiple hollow fiber membrane cartridges. Specifically, the hollow fiber membrane cartridge assembly according to the embodiment is a structure secured simply by two adapters that perform the function (function of improving airtightness) of the fixing layer (potting layer) of the related art (Korean Patent Application Publication No. 10-2018-0119828), so it is easy to replace the hollow fiber membrane cartridge.

In addition, when the hollow fiber membrane cartridge assembly according to an embodiment is applied to a membrane humidifier for a fuel cell, the problems of the related art (Korean Patent No. 10-1896323) mentioned above can be solved.

DETAILED DESCRIPTION

Hereinafter, with reference to accompanying drawings, a hollow fiber membrane cartridge according to an embodiment will be described in detail.

Figure 1:
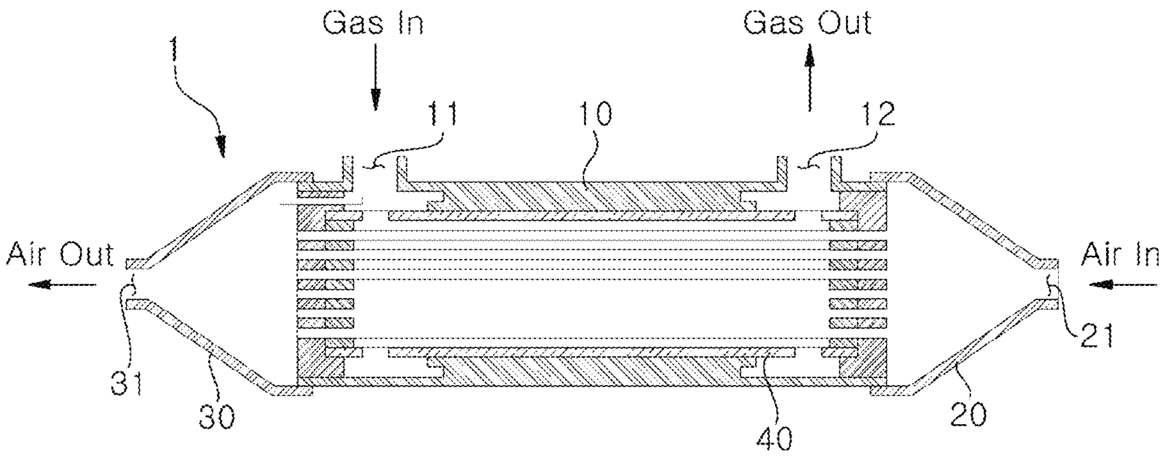
FIG. 1 is a sectional view of a conventional membrane humidifier for a fuel cell.
Figure 2:
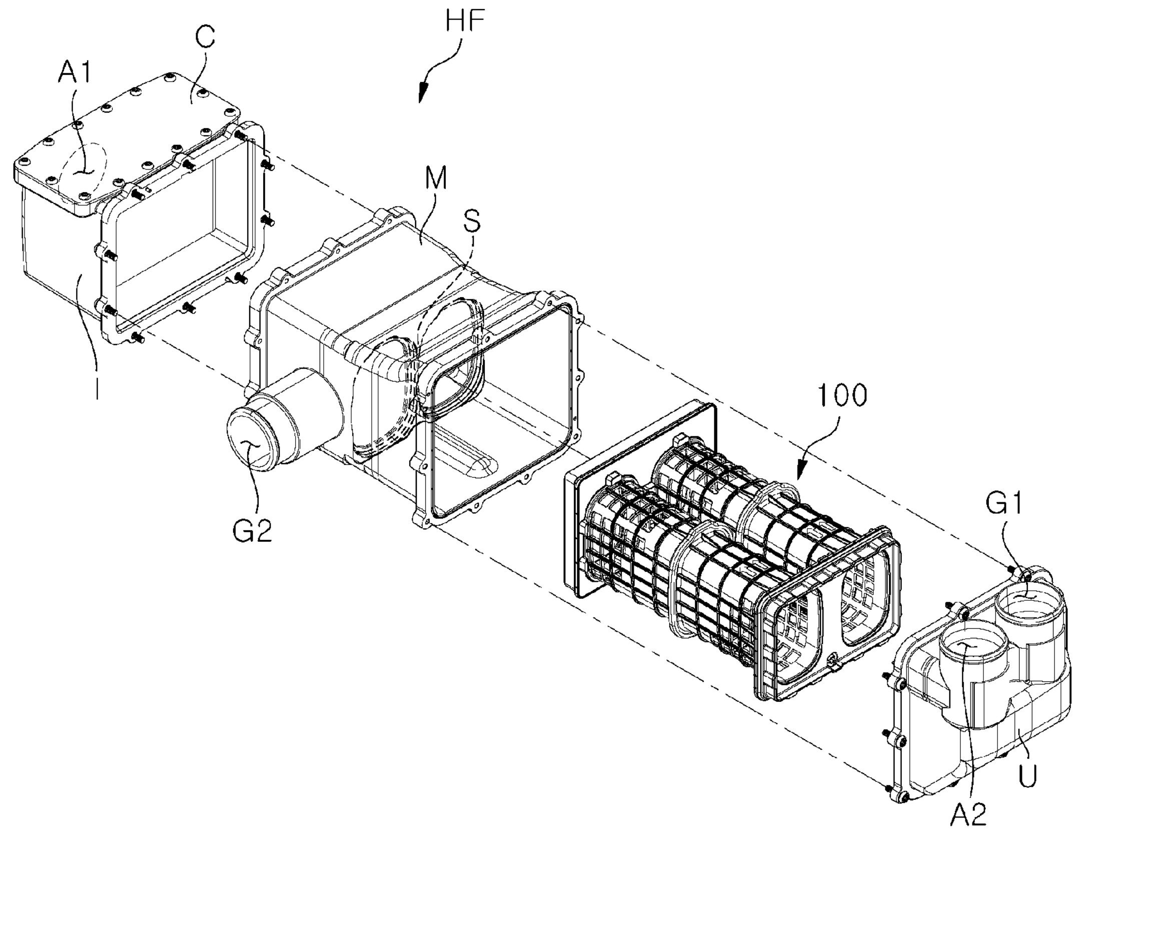
FIG. 2 is an exploded perspective view showing a membrane humidifier for a fuel cell that includes a hollow fiber membrane cartridge assembly according to an embodiment.
Figure 3:
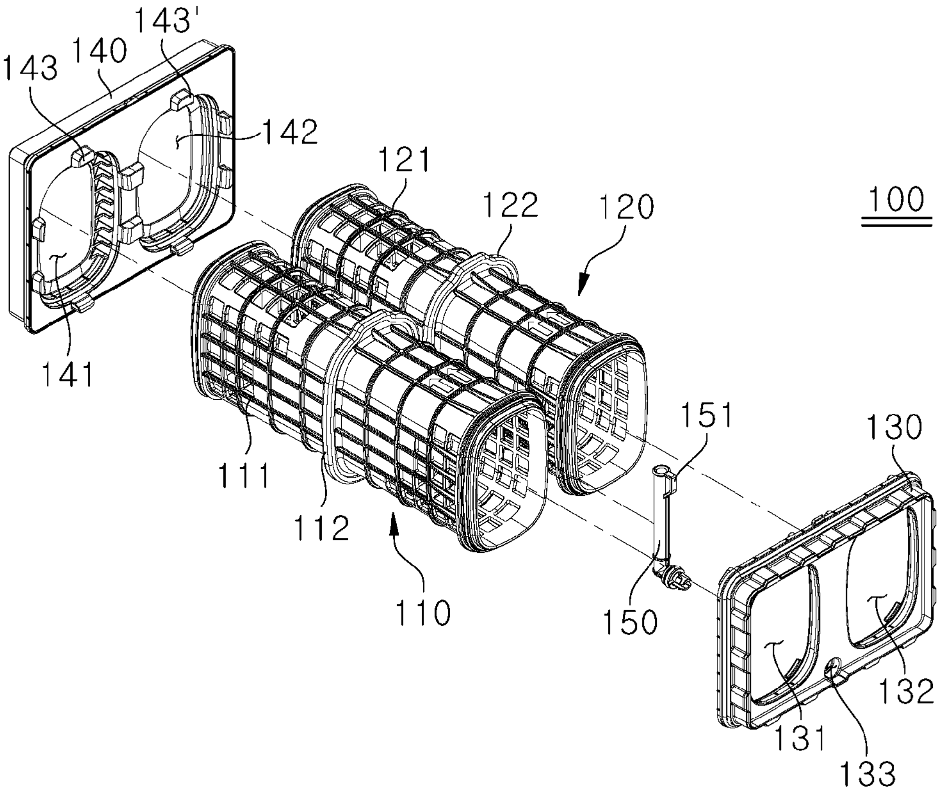
FIGS. 3 and 4 are exploded perspective views of the hollow fiber membrane cartridge assembly according to the embodiment.
Figure 4:
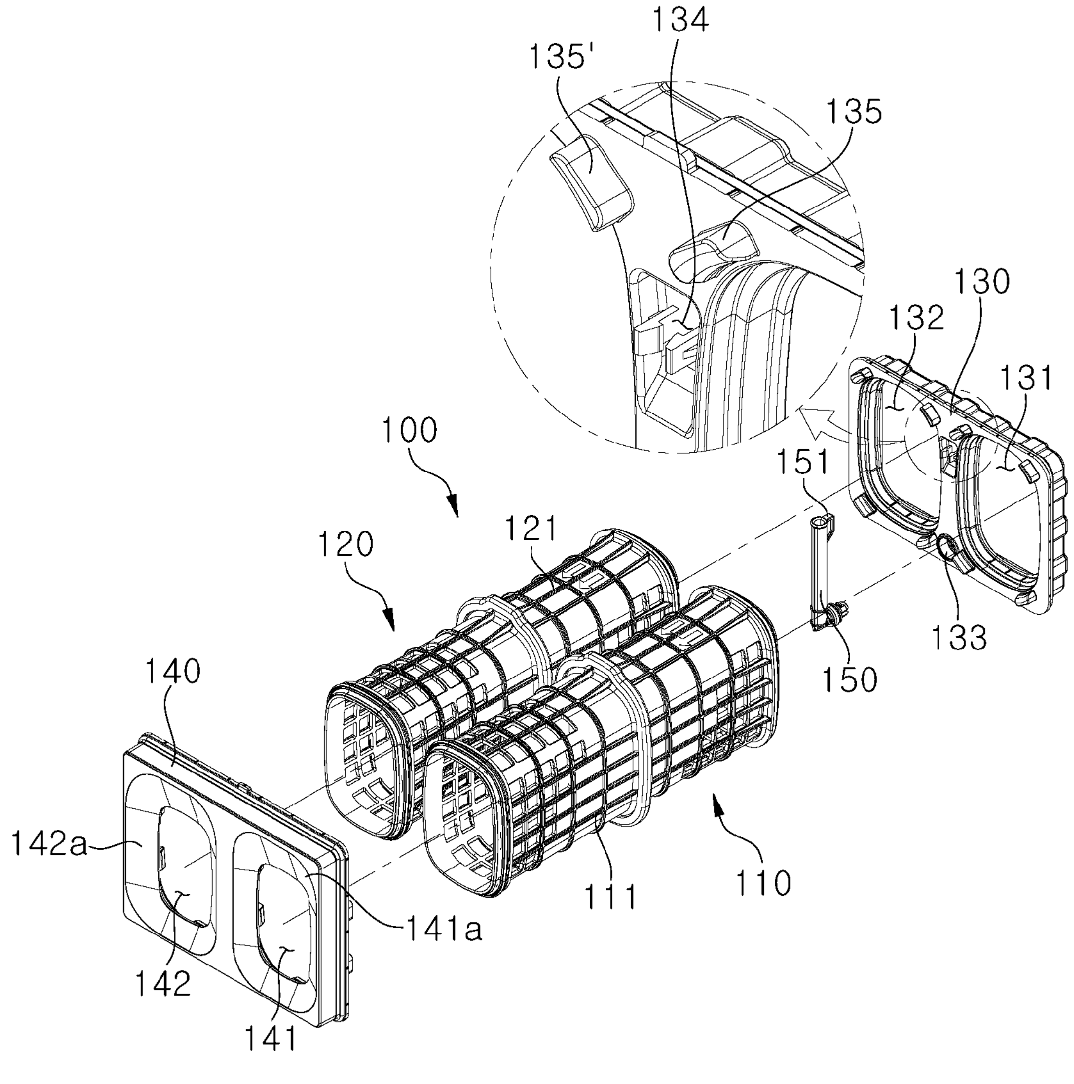

FIG. 2 is an exploded perspective view showing a membrane humidifier for a fuel cell that includes a hollow fiber membrane cartridge assembly 100 according to an embodiment (referred to "the hollow fiber membrane cartridge assembly 100" hereinafter), and FIGS. 3 and 4 are exploded perspective views of the hollow fiber membrane cartridge assembly according to the embodiment.

With reference to FIGS. 2 to 4, the hollow fiber membrane cartridge assembly 100 is provided inside the membrane humidifier for a fuel cell.

The membrane humidifier for a fuel cell is not limited to a specific shape or structure, and one of those already known may be adopted. As an example, as shown in FIG. 2, a membrane humidifier HF for a fuel cell may include: ⓐ a main housing M having a gas outlet G2 and provided with an empty space in a longitudinal direction therein; ⓑ an outlet housing U having a gas inlet G1 and an air outlet A2 and coupled to a side in the longitudinal direction of the main housing M; and ⓒ an inlet housing I having an air inlet A1 and coupled to an opposite side in the longitudinal direction of the main housing M. In addition, the inlet housing I may be equipped with an air cooler C.

When the membrane humidifier HF for a fuel cell includes a main housing M, an outlet housing U, and an inlet housing I, the hollow fiber membrane cartridge assembly 100 is located inside the main housing M and may be configured to be detachable from the main housing M.

The hollow fiber membrane cartridge assembly 100 includes a first hollow fiber membrane cartridge 110, a second hollow fiber membrane cartridge 120, a first adapter 130, a second adapter 140, and a bypass pipe 150.

The first hollow fiber membrane cartridge 110 includes a cartridge housing 111 in a form of a column whose inside is empty and a hollow fiber membrane (not shown) provided inside the cartridge housing 111.

The cartridge housing 111 may be configured to have a length corresponding to the main housing M or a length slightly longer than the main housing M. In addition, a ventilation hole may be provided on the surface of the cartridge housing 111, and at least one sealing ring may be mounted around the cartridge housing 111.

The second hollow fiber membrane cartridge 120 includes a cartridge housing 121 in a form of a column whose inside is empty and a hollow fiber membrane (not shown) provided inside the cartridge housing 121.

The cartridge housing 121 may be configured to have a length corresponding to the main housing M or a length slightly longer than the main housing M. In addition, a ventilation hole may be provided on the surface of the cartridge housing 121, and at least one sealing ring may be mounted around the cartridge housing 121.

The cartridge housing 121 of the second hollow fiber membrane cartridge 120 may be configured to have the same length as the cartridge housing 111 of the first hollow fiber membrane cartridge 110.

Inside the main housing M, the first hollow fiber membrane cartridge 110 and the second hollow fiber membrane cartridge 120 are arranged in parallel with each other.

The first adapter 130 has a first hole 131 that accommodates a side end part of the longitudinal direction of the first hollow fiber membrane cartridge 110 and a second hole 132 that accommodates a side end part of the longitudinal direction of the second hollow fiber membrane cartridge 120 and is coupled to a side of the longitudinal direction of both the first hollow fiber membrane cartridge 110 and the second hollow fiber membrane cartridge 120.

The second adapter 140 has a first hole 141 that accommodates an opposite side end part of the longitudinal direction of the first hollow fiber membrane cartridge 110 and a second hole 142 that accommodates an opposite side end part of the longitudinal direction of the second hollow fiber membrane cartridge 120 and is coupled to an opposite side of the longitudinal direction of both the first hollow fiber membrane cartridge 110 and the second hollow fiber membrane cartridge 120.

The first adapter 130 and the second adapter 140 function as a fixing layer (potting layer) that secures the hollow fiber membrane cartridge inside the main housing of a conventional membrane humidifier for fuel cells. * Refer to the first and second fixed layers 113 and 114 of Korean Patent Application Publication No. 10-2018-0119828 [FIG. 3].

Meanwhile, it is self-explanatory that the design of the hollow fiber membrane cartridge assembly 100 can be changed to include at least three hollow fiber membrane cartridges by a person skilled in the art.

In addition, a flange may be provided to protrude near a center in the longitudinal direction of each of the first hollow fiber membrane cartridge 110 and the second hollow fiber membrane cartridge 120. In addition, a partition wall S may be provided inside the main housing M to come into touch with the flange of each of the hollow fiber membrane cartridges 110 and 120, and the partition wall S above may be provided with a number of holes corresponding to a number of the hollow fiber membrane cartridges 110 and 120. At this time, middle seals 112 and 122 may be correspondingly assembled between the flanges of the hollow fiber membrane cartridges 110 and 120 and the partition wall S of the main housing M. In this case, the space around the gas inlet G1 and the space around the gas outlet G2 are completely separated by the partition wall S and the middle seals 112 and 122, so that the gas flowing into the gas inlet G1 flows focused into the hollow fiber membrane through the windows of the cartridge housing 111 and 121.

Figure 5:
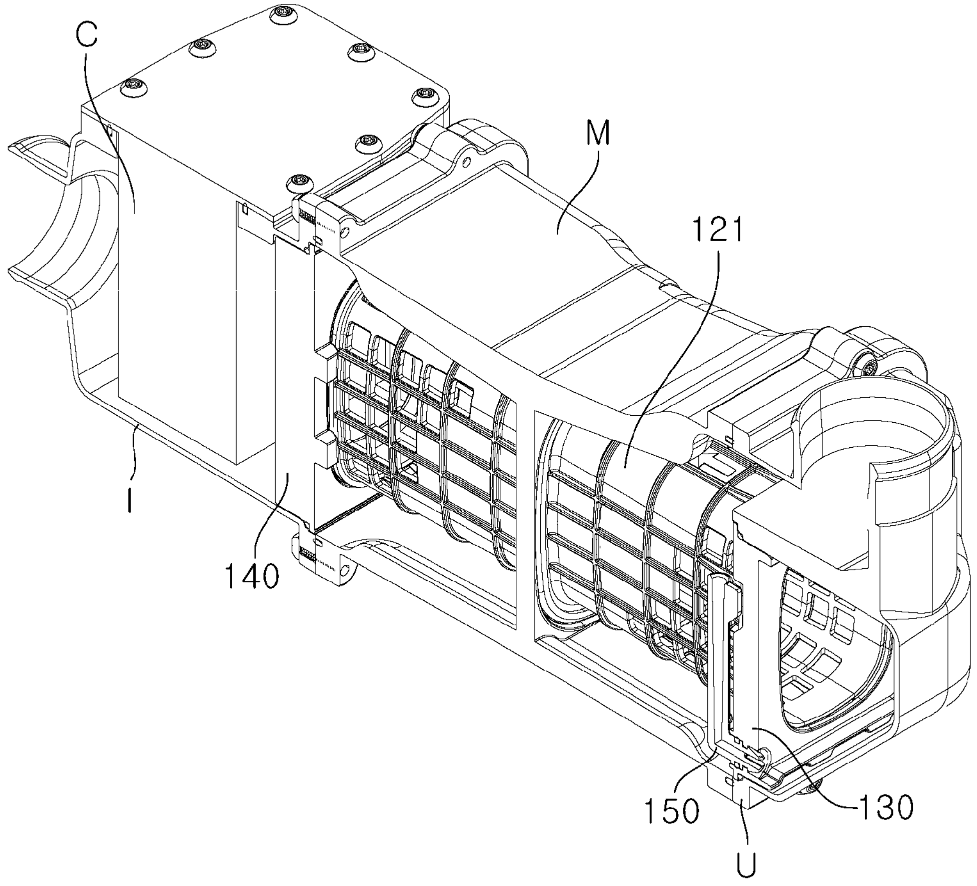
FIG. 5 is a cross-sectional perspective view where the hollow fiber membrane cartridge assembly according to the embodiment is installed in a membrane humidifier for the fuel cell.

With reference to FIG. 5, The first adapter 130 may be located in the outlet housing U, and the second adapter 140 may be located in the inlet housing I. Meanwhile, depending on the designer's intention, the first adapter 130 may be configured to be located at an end part of the main housing M or the boundary between the main housing M and the outlet housing U, and the second adapter 140 may be configured to be located at an opposite end part of the main housing M or the boundary between the main housing M and the inlet housing I.

With reference again to FIGS. 3 to 4, on a circumference of a side surface of each of the first hole 131 and the second hole 132 of the first adapter 130 (the surface facing the second adapter 140), cartridge guide protrusions 135, 135', which are configured to guide the hollow fiber membrane cartridges 110 and 120 in the process of assembling the hollow fiber membrane cartridges 110 and 120 to the first adapter 130, may be provided at regular intervals.

On a circumference of a side surface of each of the first hole 141 and the second hole 142 of the second adapter 140 (the surface facing the first adapter 130), cartridge guide protrusions 143, 143' . . . which are configured to guide the hollow fiber membrane cartridges 110 and 120 in the process of assembling the hollow fiber membrane cartridges 110 and 120 to the second adapter 140, may be provided at regular intervals.

On a circumference of an opposite side surface of each of the first hole 141 and the second hole 142 of the second adapter 140, each of inclined surfaces **141*a* and 142*a* air to smoothly flow into may be provided to allow corresponding one of the first hollow fiber membrane cartridge 110 and the second hollow fiber membrane cartridge 120**.

A bypass hole 133 is provided in a lower area of the first adapter 130.

The bypass pipe 150 is located on a side surface of the first adapter 130 and has a lower part communicated with the bypass hole 133. The bypass pipe 150 is not limited to a specific shape and, as an example, may have an 'L' shape as shown in the drawing. The bypass pipe 150 connects the outlet housing U and an upper area of the main housing M. * The specific operating principle and effects of the bypass pipe 150 are disclosed in Korean Patent No. 10-1896323 and are omitted here.

To allow the bypass pipe 150 to be firmly secured to the first adapter 130, a protrusion part 151 may be provided on an upper part of the bypass pipe 150, and a depression part 134 configured to accommodate the protrusion part 151 may be provided on a side of the first adapter 130. In addition, a securing hook fastened to the protrusion part 151 may be further provided near the depression part 134.

Due to its structure, the hollow fiber membrane cartridge assembly 100 described above has excellent airtightness and assemblibility (or maintainability).

Various expressions (terms, visualized images, and the like) used when describing the embodiment(s) of the present disclosure are merely adopted for the instrumental purpose of conveying the essential technical ideas of the present disclosure to readers in an easy-to-understand manner.

In addition, a person skilled in the art may make various modified examples that have the same essential technical idea as the above embodiment(s) but are superficially different, on the basis of the embodiment(s) of the present disclosure.

It is self-explanatory that the scope of rights of the present disclosure should not be limited by some expressions described in the "Mode for Invention" and "Description of Drawings", but should be broadly interpreted on the basis of the essential technical idea of the present disclosure.

INDUSTRIAL APPLICABILITY

The hollow fiber membrane cartridge according to an embodiment assembly has excellent airtightness and assemblability while even being provided with multiple hollow fiber membrane cartridges. Specifically, the hollow fiber membrane cartridge assembly according to the embodiment is a structure secured simply by two adapters that perform the function (function of improving airtightness) of the fixing layer (potting layer) of the related art (Korean Patent Application Publication No. 10-2018-0119828), so it is easy to replace the hollow fiber membrane cartridge.

The invention claimed is:

1. A hollow fiber membrane cartridge assembly mounted in a membrane humidifier for a fuel cell, the membrane humidifier comprising: a main housing having a gas outlet and provided with an empty space in a longitudinal direction therein; an outlet housing having a gas inlet and an air outlet and coupled to one longitudinal side of the main housing; and an inlet housing having an air inlet and coupled to an opposite longitudinal side of the main housing; the hollow fiber membrane cartridge assembly comprising:

- a first hollow fiber membrane cartridge and a second hollow fiber membrane cartridge having the same length and arranged in parallel with each other, the first hollow fiber membrane cartridge and the second hollow fiber membrane cartridge each including a cartridge housing and a hollow fiber membrane provided inside the cartridge housing;
- a first adapter having a first hole accommodating an end part of a side of the first hollow fiber membrane cartridge, a second hole accommodating an end part of a side of the second hollow fiber membrane cartridge, wherein the first adapter is located at a boundary between the main housing and the outlet housing, and wherein a bypass hole is provided in a lower area of the first adapter;
- a second adapter having a first hole accommodating an end part of an opposite side of the first hollow fiber membrane cartridge and a second hole accommodating an end part of an opposite side of the second hollow fiber membrane cartridge, wherein the second adapter is located at a boundary between the main housing and the inlet housing, the second adapter facing the first adapter; and
- a bypass pipe coupled to the bypass hole, wherein the bypass pipe is located on a side surface of the first adapter and has a lower part in fluid communication with the bypass hole, wherein the bypass pipe connects the outlet housing and an upper area of the main housing, and wherein a protrusion part is provided on an upper part of the bypass pipe, and a depression part accommodating the protrusion part is provided on a side surface of the first adapter.

2. The hollow fiber membrane cartridge assembly of claim 1, further comprising a securing hook fastened to the protrusion part near the depression part.

3. The hollow fiber membrane cartridge assembly of claim 1, wherein, on a circumference of a side surface of each of the first hole and the second hole of the first adapter, cartridge guide protrusions are provided at regular intervals.

4. The hollow fiber membrane cartridge assembly of claim 1, wherein, on a circumference of a side surface of each of the first hole and the second hole of the second adapter, cartridge guide protrusions are provided at regular intervals.

* * * * *